March 1, 1960 O. E. KALL 2,927,263
COMPOUNDED INTERNAL POLE SYNCHRONOUS GENERATOR
Filed March 9, 1956 4 Sheets-Sheet 3

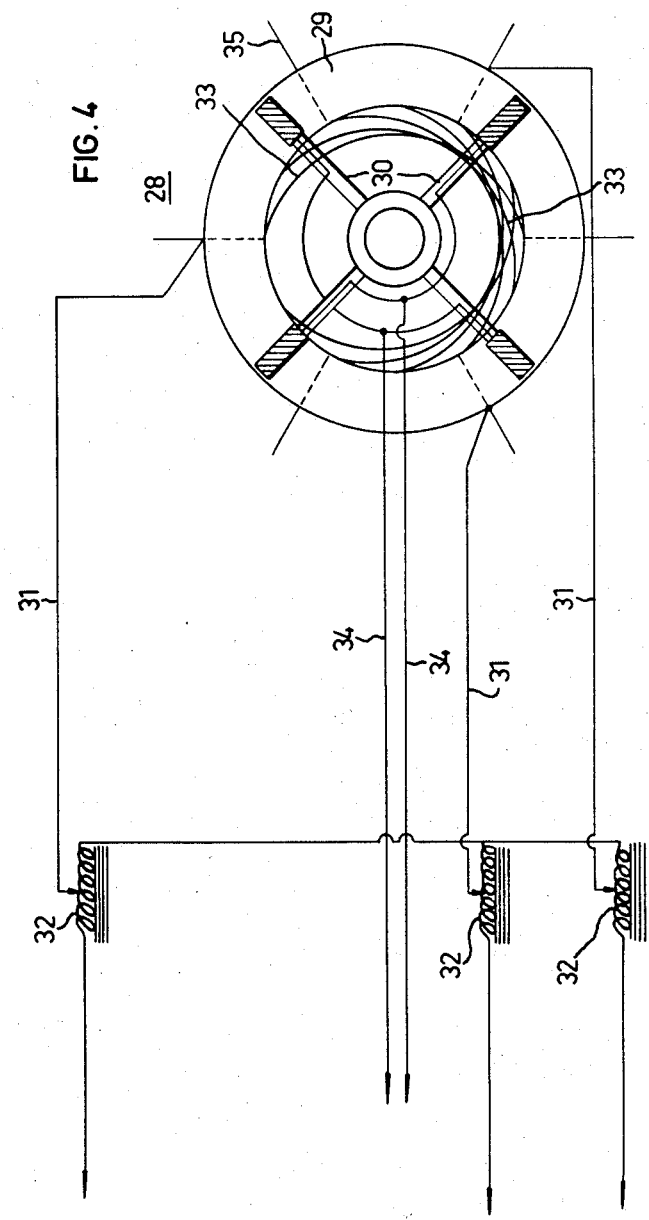

United States Patent Office 2,927,263
Patented Mar. 1, 1960

2,927,263

COMPOUNDED INTERNAL POLE SYNCHRONOUS GENERATOR

Oscar Ebbe Kall, Ljungby, Sweden, assignor to Kellma A.B., Ljungby, Sweden, a corporation of Sweden Application March 9, 1956, Serial No. 570,463

Claims priority, application Sweden March 19, 1955

8 Claims. (Cl. 322—56)

It is known to use synchronous generators for minor A.C. power stations intended to supply power for limited local needs. Such generators are specially constructed in order to keep the output voltage constant independently of load changes without the aid of any special fast regulator acting on the generator excitation. Keeping the output voltage constant has been achieved by using an exciter or excitation machine which is supplied with the load current of the generator, e.g. in a special compound winding, and supplies an excitation current, which is dependent on said current, to the field winding of the generator. This principle has been realized in different manners, but they have not been entirely satisfactory, particularly because they have implied the addition of extra commutator or slip ring means for supply or delivery of current.

The object of the present invention is to provide an improved compounded internal pole synchronous machine (the term "internal pole synchronous machine" is here used to designate the common type of synchronous machine having the magnet poles on the rotor, i.e. radially within the air gap), preferably intended to be used as a synchronous generator but possibly also as an auto-excited synchronous motor.

It is a further object of the invention to provide a compounded internal pole synchronous machine, whose exciter is adapted to generate its output direct current for the excitation of the synchronous machine exclusively by transforming an alternating current received from the armature winding of the synchronous machine.

It is still another object of the invention to provide a compounded internal pole synchronous machine of the above character, which, in addition to a commutator with associated carbon brush gear, has only fixed connections in its circuits for excitation current and armature current, whereby the drawbacks entailed by extra slip rings are entirely eliminated.

The invention will be described in detail in the following with reference to the accompanying drawings showing symbolically several different embodiments of the synchronous machine according to the invention.

Figs. 2 to 4 are symbolic views of three other embodiments, only the exciter and the conduits leading to the synchronous machine being, however, shown in Figs. 3 and 4.

Figure 1:
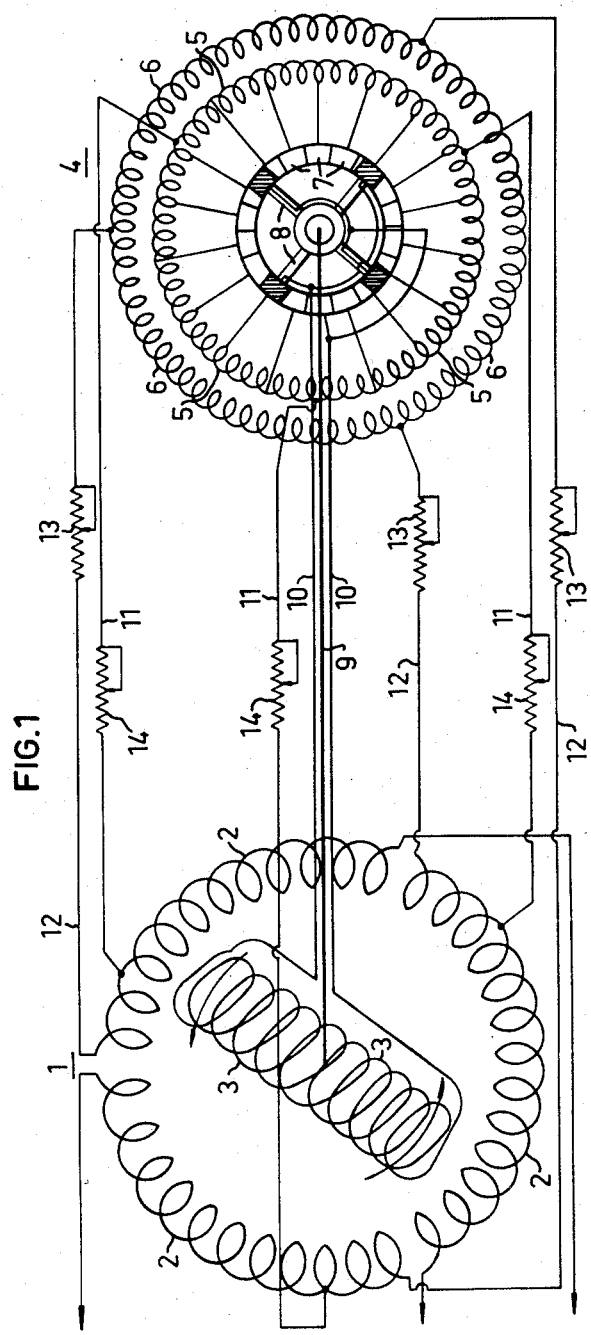
Fig. 1 is a complete symbolical view of a first embodiment showing both the synchronous machine proper and its exciter.

In Fig. 1 the synchronous machine is shown at 1, the machine comprising a stator, on which an armature winding 2 consisting of three phases is disposed, and a rotor which carries the magnet poles of the synchronous machine with its excitation winding 3. Thus, with regard to the disposal of the winding on the stator and the rotor, respectively, the synchronous machine is in agreement with what is usual in ordinary synchronous machines. The exciter of the synchronous machine is shown at 4 and essentially consists of a stator composed of two concentric members, of which members the inner one is provided with an armature winding 5 and the outer one with a compound winding 6, the former being connected to a stationary commutator 7. The whole stator together with the commutator 7 is to be adjustable to various angular positions around the machine shaft. The only rotary part of the machine is a carbon brush gear 8 co-operating with the commutator 7 and fixed on the rotor shaft 9 of the synchronous machine. The carbon brush gear is shown to comprise four carbon brushes (or groups of carbon brushes), of which each two diametrically opposed brushes are connected with each other and with each of two D.C. conduits 10 carrying the direct current supplied across the commutator and the carbon brushes to the excitation winding 3 of the synchronous machine 1.

The armature winding 5 of the exciter 4 is connected, like a three-phase winding, in three fixed points to fixed taps on each of the phases of the armature winding 2 through conduits 11. The compound winding 6 is also disposed as a three-phase winding, and each phase thereof is connected to that end of one of the phases of the armature winding 2 of the synchronous machine 1 which would otherwise be connected to the neutral point of the armature winding when Y-connected. In Fig. 1 the compound winding 6 is drawn as an endless winding to which three conduits 12 leading to the winding 2 of the synchronous machine are fixedly connected in each of three points located at an angular distance of 120°, i.e. the compound winding 6 is shown as D-connected. Actually, Y-connection of the winding 6 is preferred, however, in which case each of the phases of the armature winding 2 will be connected in series with one of the phases of the compound winding 6 between the neutral point of the load and the neutral point of the winding 6.

When considering the mode of function of the machine described, it may be assumed that the machine operates as a generator. When the machine idles, a rotating field is obtained in the exciter 4 because the induced voltage in that part of each phase of the armature winding 2 of the generator 1 which lies between the fixed tap for the respective conduit 11 and that end point to which the respective conduit 12 is connected and which can comprise e.g. a single coil of the armature winding, drives a current through the armature winding 5 of the exciter and also through the compound winding 6. By means of this rotating field there is induced in the stationary armature winding 5 an A.C. voltage which is supplied through the stationary commutator 7 across the carbon brush gear 8 rotating synchronously with the field fundamentally in exactly the same manner as in an ordinary rotary converter. When applying a load to the generator 1, the load current, because of the connection in series of each phase of the armature winding 2 of the generator 1 with the respective phase of the compound winding 6 of the exciter 4, will flow through the latter. This causes an additional component of rotating magnetic field in the exciter 4 (with a certain phase displacement in relation to the field generated by the no-load current) and thus an increase of the output voltage of the exciter.

In order that the excitation current which is supplied through the carbon brush gear 8 may be adjusted in such a way that the correct excitation at every load is obtained in the generator for maintaining a constant voltage at the desired output point, with or without over-compounding or under-compounding, the exciter is to be adjustable. There are several different possibilities for realizing such adjustability. In the conduits 12 there may be connected rheostats 13 by means of which the current and consequently the rotating field in the exciter may be controlled. Rheostats 14 may possibly be inserted also in the conduits 11. Furthermore, the outer stator, which carries the compound winding 6, may be axially slidable in relation to the inner stator. This entails, at a given unchanged amplitude of the rotating field a change, proportional to the displacement, of the whole flux and thus of the voltages induced in the armature winding 5 on the inner stator. A third way of controlling the degree of compounding of the exciter is to displace the carbon brushes, which can best be achieved by turning the stator together with the commutator 7. An angular displacement is thereby caused between the rotating field of the exciter and the carbon brush gear 8 rotating synchronously therewith, i.e. the effect becomes the same as when the carbon brushes are displaced in a D.C. machine having stationary magnet poles and a stationary carbon brush gear. As there may occur variations in the power factor of the generator load, it is also desirable to be able to control the exciter in order to adjust the compounding angle of the generator according to these variations. This is achieved due to the outer stator of the exciter being disposed so as to be rotatable within a suitable angular range in relation to the inner stator around the machine shaft.

The construction of the exciter 4 assumed above, according to which the stator is composed of two concentric stator members, is necessary for obtaining the control possibilities mentioned above through axial displacement and angular adjustment of the outer stator. If it is desired to desist from these possibilities it is, however, possible to construct the stator as a single member on which the compound winding 6 and the armature winding 5 are disposed in grooves displaced peripherally with respect to each other.

Fundamentally the same mode of function of the synchronous generator as has been described above is obtained by the device shown in Fig. 2. The synchronous generator is here indicated only through its armature winding 2, of which the end connections for one phase only are drawn completely. As can be seen from the figure, the winding is made as a lap winding. The exciter 15 is provided with a number of resistors 16 (drawn only partly) instead of with windings corresponding to the windings 5 and 6 of the exciter 4 in Fig. 1, which resistors are interconnected and connected to the bars of a stationary commutator 17 adjustable about the machine shaft, e.g. in the same manner as the coils of the winding 5 in Fig. 1, in order to act as a three-phase voltage divider. As the exciter is not dependent for its action on magnetic induction, the resistors can be disposed on a carrier of any form, although it is practical to choose a carrier of cylindrical shape. With the commutator a carbon brush gear 18 cooperates which is rigidly mounted on the rotor shaft 19 of the synchronous generator and whose carbon brushes are directly connected through two D.C. conduits 20 to the excitation winding of the generator. The resistors 16 are further connected to the three phases of the armature winding of the generator through three conduits 21, the points of connection on the resistors being chosen in such a way that the resistors lying between each two of these points have the same size and form three phases. The taps on the armature winding of the generator which, like in Fig. 1, are necessary in order to obtain no-load excitation, are disposed in Fig. 2 after the first coil of the respective phase and connected with rheostats 22 which are inter-connected to a neutral point, and the other end of each such coil is directly connected to one of the A.C. connections of the exciter 15.

The three-phase current which is supplied to the resistors 16 from the armature winding of the generator is rectified by means of the commutator 17 and the carbon brush gear 18 in order to be supplied to the conduits 20 and consequently to the excitation winding of the generator as direct current. The magnitude of this direct current becomes proportional to the three-phase current, i.e. to the generator load.

Figure 2:
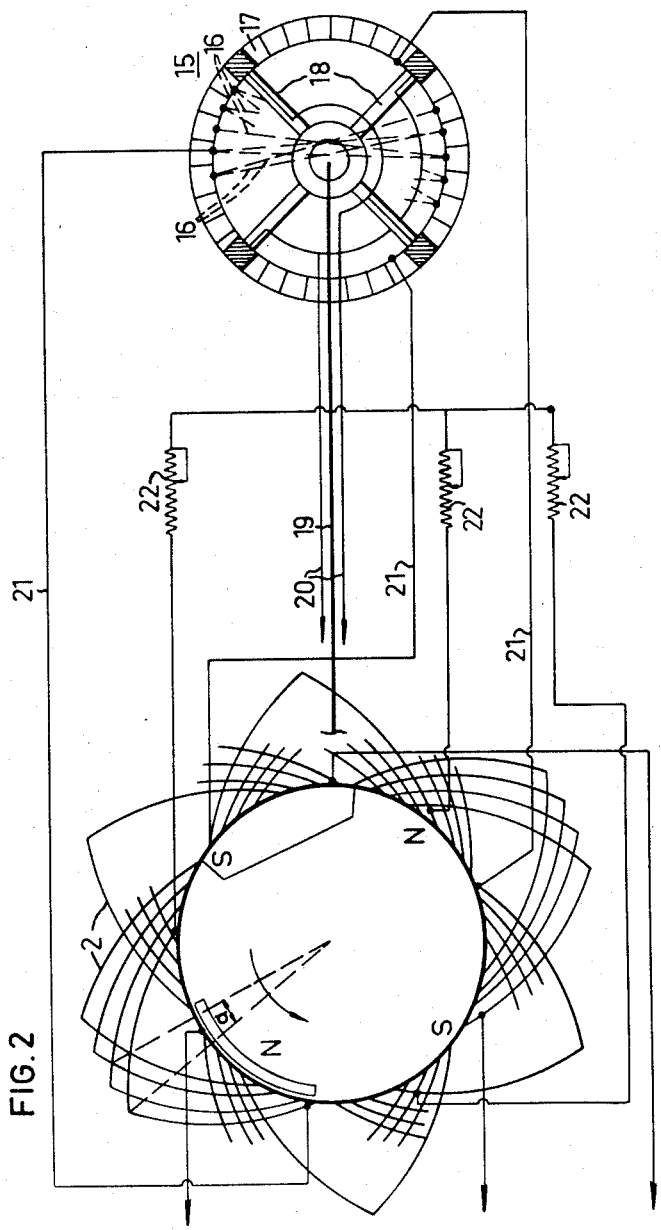

When the machine is idling, the current necessary for the excitation of the generator is obtained from the above-mentioned first coil of each phase only, the current passing through the associated conduit 21 and through a phase of the voltage divider 16 of the exciter 15 to the neutral point of said divider and further across the neutral point of the generator through the respective rheostat 22 to the tap point after the first coil. At successively increasing load on the generator with its rotor rotating in the direction of the arrow, the resultant of the main flow and the armature reaction will be displaced against the direction of rotation. This can be seen from the fact that since each group of coils consists of several coils besides the one that generates the main flux (totally four coils in the example shown) and since these additional coils are disposed in such a way along the periphery of the stator that they will be intersected earlier by the field lines starting from the pole plates of the rotor, the resulting flux is pressed farther and farther back against the direction of rotation of the rotor, the more the load increases. The result is an increased voltage and a more correct adjustment of the rotary flux of the stator in relation to the carbon brush position. The magnitude of this action is dependent on the spread of the coil and can be increased further by the use of a half-slot symmetry winding. In Fig. 2 the displacement is indicated by the angle $\alpha$ between a radius through the central point of the coil generating the main field and a radius through the central point of the whole group of coils.

Figure 3:
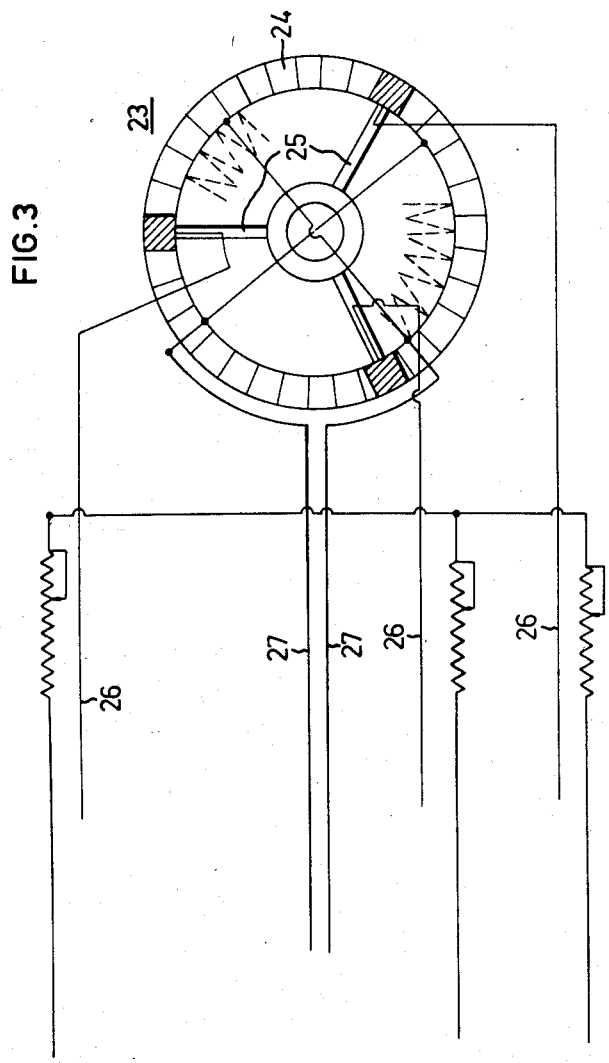

The device shown in Fig. 3 differs from the device according to Fig. 2 by a reversal of the A.C. connections and the D.C. connections of the exciter 23. The former pass across the commutator 24 and the carbon brush gear 25 which in this embodiment has only three sets of carbon brushes, each connected to one of the phases of the armature winding of the generator through conduits 26. The D.C. connections, on the other hand, are assembled into two groups, each of which is directly connected with one of the D.C. conduits 27 to the excitation winding of the generator. The commutator 24 of the exciter is to be disposed in this case on the rotor shaft of the generator, and the carbon brush gear is to be stationary.

The device according to Fig. 4 involves a further development of the device shown in Fig. 2 as the resistors 16 in the latter figure are eliminated and the exciter 28 essentially only consists of a fixedly disposed ring 29 of a resistor material having a high specific resistance and a carbon brush gear 30 co-operating therewith and mounted on the rotor shaft of the generator. In three fixed points spaced 120° apart the ring 29 is connected with the phases of the generator armature winding through conduits 31 and through three auto-transformers 32, being Y-connected on the primary side thereof, in order to be supplied with A.C. current of a lower voltage than the generator voltage. Where the carbon brush gear has four poles, as in Fig. 4, equalizing connections 33 will besides be provided between diametrically opposite points on the ring 29. As in Fig. 2, the four sets of carbon brushes of the carbon brush gear 30 form D.C. connections, which are connected through two conduits 34 with the excitation winding of the generator on the rotor. The ring 29 is provided with a number of radial cooling fins 35. The mode of function of the exciter 28 is fundamentally the same as has been described for the exciter in Fig. 2.

The invention is not limited to the embodiments described above. It is, for instance, possible to apply the modification to the device according to Fig. 1 that the armature of the exciter is constructed as a rotor having connection with a rotary commutator and that the carbon brush gear is stationary. In this case the connection of the exciter will be the same as shown in Fig. 3, i.e. the A.C. connections of the field winding of the exciter are carried through the carbon brush gear provided with three sets of carbon brushes whereas the D.C. connections from the armature winding of the exciter to the excitation circuit of the generator are fixed connections.

Although the described embodments of the synchronous machine according to the invention have been assumed to operate as generators, it may also be arranged as an auto-excited synchronous motor having adjustable compounding angle and compound degree.

As is easily realized, the invention is applicable to synchronous machines of any phase number and particularly also to one-phase machines (having a two-phase armature winding). In the latter case there is obtained in an exciter of the inductive type shown in Fig. 1 a pulsating instead of a rotating flux, but the mode of function will despite this be the same as described in connection with Fig. 1.

What I claim and desire to secure by Letters Patent is:

1. In a compounded synchronous dynamo-electric machine including a stator, an armature winding on said stator, a rotor within said stator and an excitation winding on said rotor, the provision of exciter means for converting alternating current derived from said armature winding into direct current and supplying said direct current to said excitation winding, said exciter means comprising a stationary exciter compound winding having fixed electrical connections with said armature winding, a stationary exciter armature winding inductively coupled with said compound winding, a stationary commutator electrically connected with said exciter armature winding, and rotatable brush means cooperating with said commutator and mechanically coupled with said rotor and having electrical connections fixed to the excitation winding on said rotor.

2. In a compounded synchronous dynamo-electric machine including a stator, a three-phase armature winding on said stator, a rotor within said stator and an excitation winding on said rotor, the provision of exciter means for converting alternating current derived from said three-phase armature winding into direct current and supplying said direct current to said excitation winding, said exciter means comprising a stationary exciter compound winding having fixed electrical connections at three equidistant points with the armature winding on said stator at one end of each respective phase thereof, a stationary exciter armature winding inductively coupled with said compound winding and having fixed electrical connections at three equidistant points with the armature winding on said stator at one tap point on each respective phase thereof, a stationary commutator electrically connected with said exciter armature winding, and rotatable brush means cooperating with said commutator and mechanically coupled with said rotor and having electrical connections fixed to the excitation winding on said rotor.

3. In a compounded synchronous dynamo-electric machine including a stator, an armature winding on said stator, a rotor within said stator and an excitation winding on said rotor, the provisions of exciter means for converting alternating current derived from said armature winding into direct current and supplying said direct current to said excitation winding, said exciter means comprising a stationary exciter compound winding having fixed electrical connections with said armature winding, a stationary exciter armature winding inductively coupled with said compound winding, a stationary commutator electrically connected with said exciter armature winding, said stationary exciter compound winding being angularly adjustable in relation to said stationary exciter armature winding and said commutator, and rotatable brush means cooperating with said commutator and mechanically coupled with said rotor and having electrical connections fixed to the excitation winding on said rotor.

4. In a compounded synchronous dynamo-electric machine including a stator, an armature winding on said stator, a rotor within said stator and an excitation winding on said rotor, the provision of means for converting alternating current derived from said armature winding into direct current and supplying said direct current to said excitation winding, said means comprising interconnected resistors, a commutator fixed in relation to and electrically connected with said resistors, and brush means cooperating with said commutator, said resistors and said commutator forming an exciter subassembly and said brush means forming another exciter subassembly, one of said subassemblies being stationary and having fixed electrical connections with said armature winding and the other of said subassemblies being rotatably mounted and mechanically coupled with said rotor and having electrical connections fixed to the excitation winding on said rotor and means for angularly adjusting said stationary subassembly with respect to said stator.

5. In a compounded synchronous dynamo-electric machine including a stator, an armature winding on said stator, a rotor within said stator and an excitation winding on said stator, the provision of means for converting alternating current derived from said armature winding into direct current and supplying said direct current to said excitation winding, said means comprising interconnected stationary resistors having fixed electrical connections with said armature winding, a stationary commutator electrically connected with said resistors at the interconnection points thereof, said stationary resistors and said stationary commutator being angularly adjustable as a unit in relation to said stator and rotatable brush means cooperating with said commutator and mechanically coupled with said rotor and having electrical connections fixed to the excitation winding on said rotor.

6. In a compounded synchronous dynamo-electric machine including a stator, an armature winding on said stator, a rotor within said stator and an excitation winding on said rotor, the provision of means for converting alternating current derived from said armature winding into direct current and supplying said direct current to said excitation winding, said means comprising a ring of resistant material and commutating means including brush gear cooperating with said ring, said ring and said brush gear forming relatively rotating members, one being stationary and having fixed electrical connections with said armature winding and the other being rotatably mounted and mechanically coupled with said rotor and having electrical connections fixed to the excitation winding on said rotor.

7. In a compounded synchronous dynamo-electric machine including a stator, an armature winding on said stator, a rotor within said stator and an excitation winding on said rotor, the provision of means for converting alternating current derived from said armature winding into direct current and supplying said direct current to said excitation winding, said means comprising interconnected impedance circuit elements, a commutator fixed in relation to and electrically connected with said circuit elements, brush means cooperating with said commutator, said circuit elements and said commutator means forming an exciter subassembly and said brush means forming another exciter subassembly, one of said subassemblies being stationary and having fixed electrical connections with said armature winding and the other of said subassemblies being rotatably mounted and mechanically coupled with said rotor and having electrical connections fixed to the excitation winding on said rotor, and means for angularly adjusting said stationary subassembly with respect to said stator.

8. In a compounded synchronous dynamo-electric machine including a stator, an armature winding on said stator, a rotor within said stator and an excitation winding on said rotor, the provision of means for converting alternating current derived from said armature winding into direct current and supplying said direct current to said excitation winding, said means comprising interconnected impedance circuit elements, a commutator fixed in relation to and electrically connected with said circuit elements, and brush means cooperating with said commutator, said circuit elements and said commutator forming a stationary exciter subassembly having fixed electrical connections with said armature winding and being angularly adjustable in relation to said stator, and said brush means forming a rotatably mounted exciter subasssembly mechanically coupled with said rotor and having electrical connections fixed to the excitation winding on said rotor.

References Cited in the file of this patent

UNITED STATES PATENTS

| | | | |
|---|---|---|---|
| 479,951 | Marvin | Aug. 2, | 1892 |
| 630,233 | Hutin | Aug. 1, | 1899 |
| 653,089 | Hutin | July 3, | 1900 |
| 713,022 | Steinmetz | Nov. 4, | 1902 |
| 781,878 | Harle | Feb. 7, | 1905 |
| 2,345,805 | Gibson | Apr. 4, | 1944 |

FOREIGN PATENTS

| | | | |
|---|---|---|---|
| 4,871 | Great Britain | of | 1906 |
| 375,091 | France | June 29, | 1907 |